United States Patent [19]

Hudgins

[11] 4,190,928

[45] Mar. 4, 1980

[54] APPARATUS FOR THE EMERGENCY PULLING OF SMALL CABLES ON MOTORCYCLES, BOATS AND OTHER SMALL MACHINERY

[76] Inventor: William C. Hudgins, 9756 Beech Pl., Manassas, Va. 22110

[21] Appl. No.: 841,047

[22] Filed: Oct. 11, 1977

[51] Int. Cl.² .............................................. G05G 1/02
[52] U.S. Cl. ................................ 16/111 R; 16/111 A; 74/543; 123/185 BA
[58] Field of Search ...................... 173/13, 18; 74/543, 74/544, 545; 123/185 BA; 16/111 R, 111 A, 114 B, 122

[56] References Cited

U.S. PATENT DOCUMENTS

| | | | |
|---|---|---|---|
| 2,204,750 | 6/1940 | Conover | 123/185 BA |
| 2,248,328 | 7/1941 | Bechik | 16/114 B |
| 2,722,209 | 11/1955 | Pillow | 123/185 BA |
| 2,869,531 | 1/1959 | Cedermark | 123/185 BA |
| 3,129,606 | 4/1964 | Harty | 74/543 |

*Primary Examiner*—Louis Rimrodt
*Attorney, Agent, or Firm*—Robert H. Epstein

[57] ABSTRACT

A tool for pulling cables on motorcycles, boats and other small machinery comprising a metal rod, a hole passing from the base of the metal rod at an angle and piercing the lateral wall of the rod to pass cables through, a set-bolt perpendicular to the angular hole to secure cables, and a handle so that the apparatus may be pulled with the cable attached.

1 Claim, 3 Drawing Figures

APPARATUS FOR THE EMERGENCY PULLING OF SMALL CABLES ON MOTORCYCLES, BOATS AND OTHER SMALL MACHINERY

SUMMARY OF THE INVENTION

The object of the invention is to provide a method for the emergency pulling of cables on motorcycles, boats and other small machinery when the regular means for pulling such cables has become disabled through breakage of the cable and immediate repair is unavailable, thereby incapacitating the motorcycle, boat or other small machinery.

According to the invention there is provided a tool for pulling a cable on a motorcycle, boat or other small machinery comprising of a rod, a hole in the rod passing at an angle from the base of the rod through the lateral wall of the rod, a set-bolt to hold cables that are passed through the rod securely, and a handle so the tool may be pulled, thereby pulling the cable.

BRIEF DESCRIPTION OF THE DRAWING

There is hereinafter described by way of example an embodiment of the invention with reference to the accompanying drawing, wherein.

DETAILED DESCRIPTION OF THE TOOL

Figure 2:
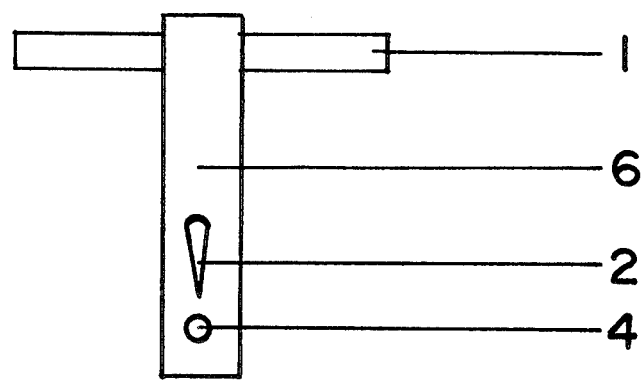
FIG. 2 is a rear view of the tool.

Referring to FIG. 2, a tool embodying the invention comprises a body including a straight metallic elongate rod or shank (6), of about but not necessarily 2.5 inches in length and about but not necessarily 0.5 inches in diameter. At the uppermost end of the shank (6), the body is equipped with a cross-bar (1) for a handle.

Figure 1:
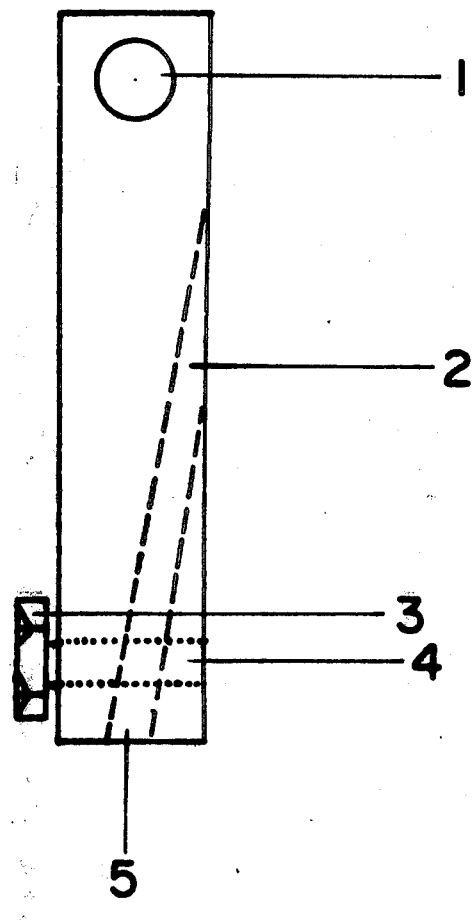
FIG. 1 is a part-section view in side elevation of the tool.
Figure 3:
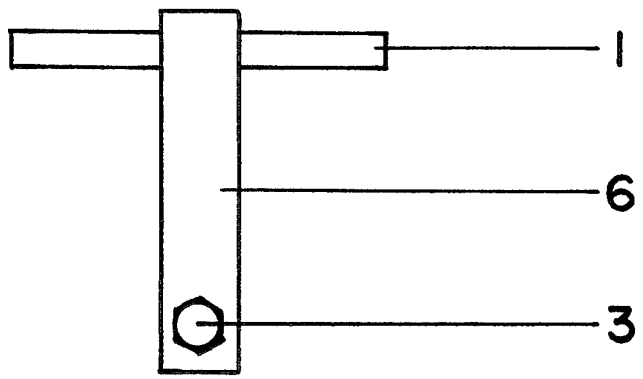
FIG. 3 is a frontal view of the tool.

Referring to FIGS. 1, 2 and 3, a through bore (5) of appropriate diameter passes at an acute angle from the end of the shank, to pierce the lateral wall of the shank forming groove (2) so a cable may pass freely and completely through a portion of the shank (6).

A hole (4) is provided perpendicular to the bore (5) passing at an angle through the shank (6) for the purpose of receiving a set-bolt (3) to secure any cable that is passed through the angular bore (5).

In use, the end of a broken cable is inserted into bore (5) from the end of the shank, as much cable as desired being passed through the shank. The set bolt is then screwed into hole (4), engaging the cable, whereupon the handle may be pulled to apply tension to the cable. The angled orientation of the through bore 5 has the advantages of permitting any length of cable to be passed through the shank without interfering with the grip provided by the handle and of affording a more comfortable grip eliminating the danger of hand abrasion or injury caused by a protruding metallic cable.

Inasmuch as the present invention is subject to many variations, modifications and changes in detail, it is intended that all subject matter discussed above or shown in the accompanying drawings be interpreted as illustrative and not in a limiting sense.

I claim:

1. An emergency tool for the hand pulling of cables on motorcycles, boats and other small machinery comprising
   a body including an elongate shank having a first end and a second end and a handle extending transversely to said shank at said first end;
   an internally threaded hole disposed in said shank at said second end having an axis extending perpendicular to the longitudinal axis of said shank;
   a set bolt threadedly engaging said hole; and
   a through bore extending through a portion of said shank and communicating with said hole, said bore being arranged at an acute angle to the longitudinal axis of said shank to extend from said second end to a lateral side wall of said shank whereby any length of cable can be passed through said bore and held in place by said set bolt.

* * * * *